(12) United States Patent
Tan

(10) Patent No.: US 11,505,031 B2
(45) Date of Patent: Nov. 22, 2022

(54) VEHICLE THERMAL METHOD AND SYSTEM

(71) Applicant: Aikar Technology Inc., Torrance, CA (US)

(72) Inventor: Jiannan Tan, Irvine, CA (US)

(73) Assignee: Aikar Technology Inc., Torrance, CA (US)

( * ) Notice: Subject to any disclaimer, the term of this patent is extended or adjusted under 35 U.S.C. 154(b) by 284 days.

(21) Appl. No.: 15/930,206

(22) Filed: May 12, 2020

(65) Prior Publication Data

US 2020/0361279 A1 Nov. 19, 2020

Related U.S. Application Data

(60) Provisional application No. 62/846,873, filed on May 13, 2019.

(51) Int. Cl.
| | | |
|---|---|---|
| *G06F 7/00* | (2006.01) | |
| *B60H 1/00* | (2006.01) | |
| *B60H 1/32* | (2006.01) | |
| *B60H 1/22* | (2006.01) | |
| *G05B 15/02* | (2006.01) | |

(52) U.S. Cl.
CPC ..... *B60H 1/00385* (2013.01); *B60H 1/00278* (2013.01); *B60H 1/00321* (2013.01); *B60H 1/00485* (2013.01); *B60H 1/22* (2013.01); *B60H 1/3211* (2013.01); *B60H 1/00814* (2013.01); *B60H 2001/00121* (2013.01); *G05B 15/02* (2013.01)

(58) Field of Classification Search
CPC ............ B60H 1/00385; B60H 1/00272; B60H 1/00321; B60H 1/00485; B60H 1/22; B60H 1/3211; B60H 1/00814; B60H 2001/00121; G05B 15/02
USPC ........................................................ 701/36
See application file for complete search history.

(56) References Cited

U.S. PATENT DOCUMENTS

| | | | |
|---|---|---|---|
| 2016/0221413 A1* | 8/2016 | Gebbie | ............... B60H 1/00921 |
| 2017/0008407 A1* | 1/2017 | Porras | ..................... B60L 58/27 |
| 2020/0290429 A1* | 9/2020 | Blatchley | ............. B60H 1/2218 |
| 2022/0055454 A1* | 2/2022 | Lee | ................... H01M 10/6568 |

* cited by examiner

*Primary Examiner* — Davis D Hwu
(74) *Attorney, Agent, or Firm* — Veros Legal Solutions, LLP

(57) ABSTRACT

A thermal system of a vehicle, including: a heat exchanger; a accumulator and a compressor; a cabin evaporator; a cabin condenser; and a battery; wherein the heat exchanger, accumulator, compressor, cabin evaporator, cabin condenser, and battery are connected to allow refrigerant heat and cool a passenger cabin and the battery in a single closed and connected circuit directly without any dedicated heat exchanger; and wherein the heating and cooling of the cabin and the battery are controlled by settings of a plurality of valves.

13 Claims, 2 Drawing Sheets

VEHICLE THERMAL METHOD AND SYSTEM

CROSS REFERENCE TO RELATED APPLICATION

The present application is based on and claims the benefits of priority to the following U.S. Provisional Patent Application: Ser. No. 62/846,873 filed on May 13, 2019, the entire content of which is incorporated herein by reference.

FIELD

This relates generally to vehicle thermal systems and methods, and more particularly, to a refrigerant based direct heating and cooling thermal system and method.

BACKGROUND

Hybrid vehicles including hybrid plug-in vehicles and electric vehicles are gaining popularity. These types of vehicles typically include one or more batteries. The batteries can be high voltage batteries that can be the main or secondary power source of the vehicle. For the batteries to operate normally, proper cooling and/or heating is needed. In addition, the temperature in the cabin of the vehicle also needs to be adjusted to provide a comfortable environment to the vehicle occupants. Accordingly, it is desirable to have a vehicle thermal system that can heat and cool both the passenger cabin and the battery pack of the vehicle with reduced complexity.

SUMMARY

This disclosure relates vehicle thermal systems and methods. Specifically, embodiments of the disclosure are directed to integrated thermal system and method that can provide thermal management (e.g., heating and cooling) of both the battery (and other powertrain components) and the passenger cabin of the vehicle. The disclosure system can eliminate some of the common components in existing thermal management systems.

DETAILED DESCRIPTION OF THE PREFERRED EMBODIMENTS

In the following description of preferred embodiments, reference is made to the accompanying drawings which form a part hereof, and in which it is shown by way of illustration specific embodiments, which can be practiced. It is to be understood that other embodiments can be used and structural changes can be made without departing from the scope of the embodiments of this disclosure.

In general, embodiments of the present disclose are directed to vehicle thermal systems and methods. Specifically, embodiments of an integrated thermal system that can provide thermal management (e.g., heating and cooling) of both the battery (and other powertrain components) and the passenger cabin of the vehicle are disclosed. It is contemplated that the vehicle may be an electric vehicle, a fuel cell vehicle, a hybrid vehicle, a hybrid plug-in vehicle, or any other types of vehicle (generally referred to hereinafter as "EV") that utilizes one or more batteries as its power source. The vehicle may have any body style, such as a sports car, a coupe, a sedan, a pick-up truck, a station wagon, a sports utility vehicle (SUV), a minivan, or a conversion van. The vehicle may include at least one battery pack (or "battery") that serves as the energy source of the vehicle. The battery pack can include one or more batteries cells. The battery pack can be a high voltage battery or any other type of battery suitable for use in a vehicle. Most if not all EV battery packs generally need to operate within a specific temperature range. When the temperature is too high or too low, the battery pack may not function properly and may even become a safety hazard in extreme cases. As such, maintaining the temperature of the battery within the desired range is critical.

EVs, like most other vehicles, also have a HVAC (heating, ventilation, and air conditioning) system that can adjust the temperature of the occupant compartment (or cabin) automatically or in response to user (occupant) input by the occupant. In most existing vehicles including EVs, the thermal system that monitors, maintains, and adjusts the temperature of the battery (and/or other powertrain components) requires components (e.g., resistor heater or positive thermal coefficient (PTC) heater) that are not shared with the vehicle's HVAC system (i.e., the thermal system that manages the temperature of the occupant compartment). As a result, the overall thermal management system for the vehicle can be overly complicated.

Embodiments of the present disclose seek to provide one integrated thermal system for both the battery and the occupant compartment of an EV that eliminates the needs for some of the components found in existing thermal systems.

Figure 1:
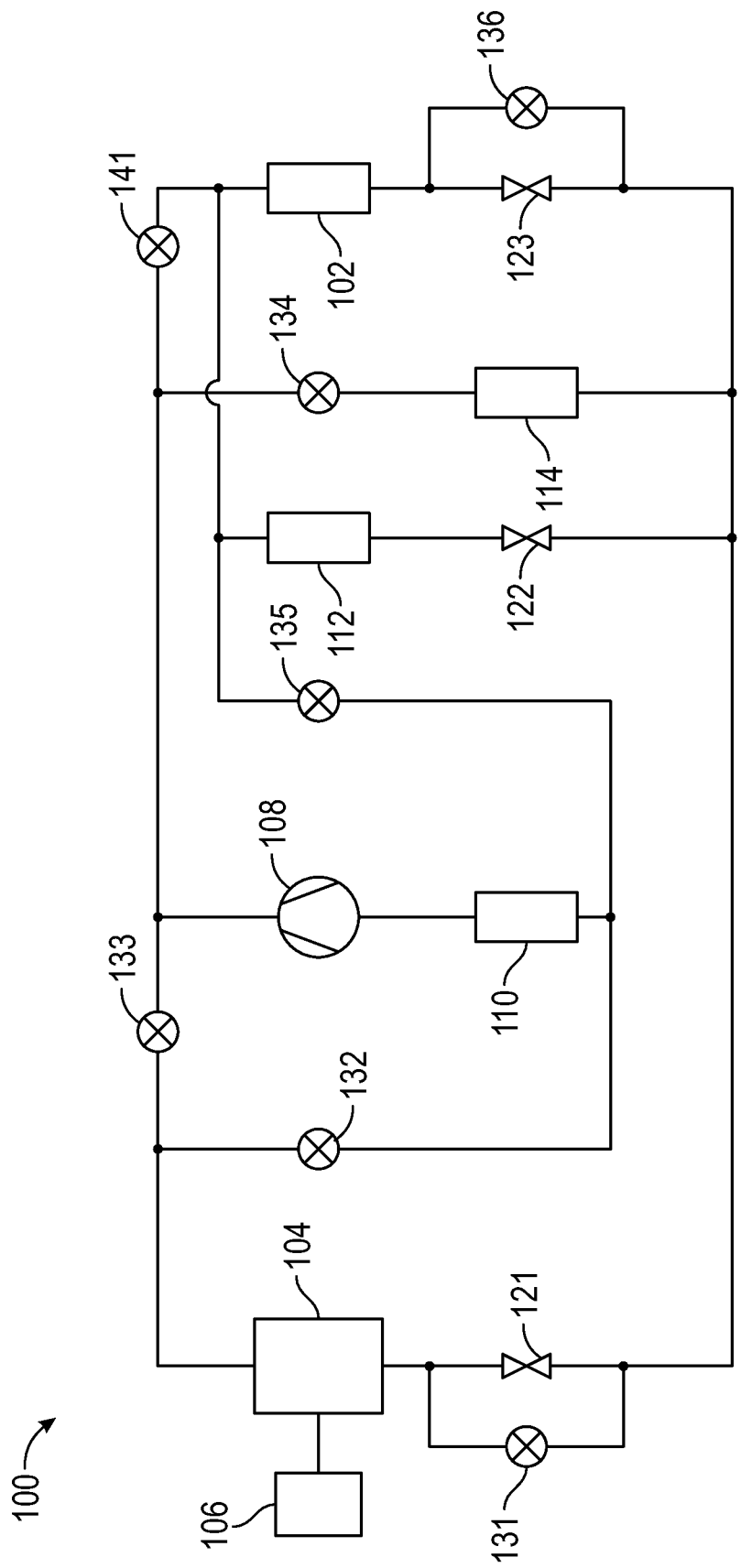
FIG. 1 illustrates an exemplary thermal circuit for a battery-powered vehicle, according to an embodiment of the disclosure.

FIG. 1 illustrates an exemplary thermal circuit 100 for a battery-powered vehicle (not shown in FIG. 1), according to an embodiment of the disclosure. Thermal circuit 100 can include an outdoor heat exchanger (HEX) 104, an air conditioning (AC) compressor 108, an accumulator 110, a cabin evaporator 112, a cabin condenser 114, and a battery pack 102. As illustrated in FIG. 1, multiple valves can be positioned at various locations of thermal circuit 100 and selectively connect the refrigerant path between two or more of the above-listed components of thermal circuit 100. Different types of valves can be used including, for example, electronic expansion valves (EXVs) 121, 122, 123, solenoid valves (SOVs) 131, 132, 133, 134, 135, 136, and adjustable gas/vapor control valve 141 at different locations of thermal circuit 100.

A fan 106 can be connected to the outdoor HEX 104 and, when turned on, blow air from outside of the vehicle into the outdoor HEX 104. This effectively turns the outdoor HEX 104 into a heat pump. The compressor 108 can pressurize the refrigerant, turning it into a hot, high-pressure gas. The cabin condenser 114 can condense the hot, high-pressure gas from a gaseous to a liquid state, by cooling it, and thereby releasing heat to the passenger cabin. The cabin evaporator 112 can, on the other hand, turn the refrigerant from a liquid form into a gaseous form while absorbing heat from an enclosed area, such as the passenger cabin of the vehicle, thereby cooling the passenger cabin. Battery pack 102 can include one or more battery cells (not shown in FIG. 1). Refrigerant circulating through the thermal circuit 100 can pass through or around the battery pack 102 to provide heating or cooling to battery pack 102.

In a first mode of operation, thermal circuit 100 can provide both cabin heating and battery pack heating. In this first mode, SOVs 132, 134, 136 can be set to an open (or on) position. SOVs 131, 133, 135 can be set to a closed (or off) position. EXV 121 can be set to an open (or on) position. EXV 122, 123 can be set to a closed (or off) position. The adjustable gas/vapor control valve 141 can be set to an open (or on) position.

The outdoor HEX 104 can heat up the refrigerant using external hot air blew in by the fan 106. Because SOVs 133 and 135 are closed, the heated refrigerant can travel (in a clockwise direction) along thermal circuit 100 through open SOV 132 to the accumulator 110 and then by suction to the compressor 108, which puts the refrigerant under high pressure. The compressed refrigerant then goes through open SOV 134 to the cabin condenser 114. The condenser 114 condenses the hot high-pressure refrigerant from a gaseous to a liquid state and, as a result, releasing heat to the passenger cabin. After exiting the passenger cabin, the refrigerant can circulate back to the outdoor HEX 104 through the open EXV 121 (SOV 131 is closed).

In parallel, the hot compressed refrigerant from the compressor 108 can also travel through the open adjustable gas/vapor control valve 141 to reach the battery mpack 102 and heat up the batter pack 102. The refrigerant exiting the battery can also be routed back to the outdoor HEX 104 through the open SOV 136 (EXV 123 is closed) and EXV 121 (SOV 131 is closed). In this mode, the outdoor HEX 104 can essentially serve as a heat bump that provide heating through the illustrated thermal circuit to both the passenger cabin and the battery pack 102.

In a second mode of operation, thermal circuit 100 can provide cooling to both the passenger cabin and the battery 102. In this second mode, SOVs 131, 133, 135 are set to an open (or on) position. SOVs 132, 134, 136 are set to a closed (or off) position. EXV 121 is set to a closed (or off) position. EXVs 122, 123 are set to an open (or on) position. Adjustable gas/vapor control valve 141 is set to a closed position. Essentially, the valves in the second mode are each set to the opposite setting of that in the first mode.

When operating in this second cooling mode, the refrigerant flows through open SOV 133 (SOV 132 is closed) and then the compressor 108 and the accumulator 110 in the opposite direct as it does in the first mode described above. Both SOV 134 and adjustable gas/vapor control valve 141 are closed, blocking the alternative paths. The refrigerant exiting the compressor 108 are accumulated in the accumulator 110 in liquid form. The liquid refrigerant then passes through open SOV 135 to reach the cabin evaporator 112, which turns the refrigerant from a liquid form into a gaseous form while absorbing heat from an enclosed area, such as the passenger cabin of the vehicle, thereby cooling the passenger cabin.

In parallel, the liquid refrigerant also reaches the battery pack 102 after passing through SOV 135. Similarly, by turning to gaseous form, the refrigerant can also lower the temperature of the battery pack 102 as it passes through or around the battery pack 102.

After exiting the cabin evaporator 112 and battery pack 102, the refrigerant is routed through open EXVs 122, 123, respectively. SOV 136 is closed, blocking the alternative path of the refrigerant after it exits the battery. The refrigerant from EXVs 122, 123 can then converge and return to the outdoor HEX 104 through open SOV 131. In this second mode, thermal circuit 100 can cool both the passenger cabin and the battery pack 102.

In a third mode, thermal circuit 100 can provide heating for the passenger cabin while cooling the battery at the same time. In this third mode, SOVs 134, 135 are set to an open (or on) position. SOVs 131, 132, 133, 136 are set to a closed (or off) position. EXVs 121, 122 are set to a closed (or off) position. EXV 123 is set to an open (or on) position. Adjustable gas/vapor control valve 141 is set to a closed (or off) position.

When operating in the third mode, the refrigerant is compressed to hot high-pressure gas by the compressor 112. Because adjustable gas/vapor control valve 141 is closed, the compressed refrigerant is forced through open SOV 134 to cabin condenser 114, which heats up the cabin by releasing heat. After exiting the condenser 114, the refrigerant is directed through open EXV 123 due to the alternative routes being blocked as a result of the closed SOVs 131, 136 and EXV 122. The EXV 123 expands the refrigerant to absorb heat from the battery pack 102, thereby lowering the temperature of the battery pack 102.

Thereafter, the refrigerant is routed through SOV 135 back to the accumulator 110 and the compressor 108, as a result of EXV 122 being closed to prevent the refrigerant from flowing through cabin evaporator 112. When set in the third mode, thermal circuit 100 can provide heating to the cabin while cooling the battery pack 102.

In a fourth mode of operation, which is an alternative (or enhanced) mode to the third mode, thermal circuit can also heat the passenger cabin while cooling the battery pack 102. In this fourth mode, SOVS 131, 133, 134, 135 are set to an open (or on) position. SOVs 132 and 136 are set to a closed (or off) position. EXVs 121 and 122 are closed, while EXV 123 is open. Adjustable gas/vapor control valve 141 is set to a closed (or off) position.

When operating in the fourth, the hot compressed refrigerant exiting the compressor 112 is routed not only to cabin condenser 114 through open SOV 134 to heat the cabin, but also routed through open SOV 133 to outdoor HEX 104. The output from the outdoor HEX 104 passes through open SOV 131 (with EXV 121 in a closed position) to converge with the output from the cabin condenser 114 and is then expanded through EXV 123 (with SOV 136 in a closed position). The expansion absorbs heat from battery pack 120, thereby achieving a cooling effect on the battery pack 120. In this (fourth) mode, the additional routing of the refrigerant through open SOV 133, outdoor HEX 104, open SOV 131 can increase the cooling effect on the battery, when compared to thermal circuit 100 operating in the above-described third mode.

The path of the refrigerant after having cooled the battery pack 102 in the fourth operation mode is the same as that in the third operation mode. Specifically, the refrigerant is routed through open SOV 135 back to the accumulator 110 and the compressor 108. EXV 122 is closed in this mode to prevent the refrigerant from flowing through cabin evaporator 112.

It should be understood that the valves, compressor, outdoor HEX, cabin evaporator, cabin condenser of the thermal circuit in the above embodiment can be replaced by other mechanisms/components suitable for achieving the same purpose. It should be understood that the refrigerant used in the above-described embodiment can be any suitable refrigerant such as R134a, R1234yf, R744. It should also be understood that the thermal circuit can include any type of tubes suitable for facilitating the flow of the refrigerant and the refrigerant can flow in different directions within the thermal circuit depending on the settings of the valves. Although not shown in the example of FIG. 1, thermal circuit 100 may also include one or more temperature/pressure sensors at desired locations of the circuit to monitor the temperature and/or pressure of the refrigerant as it passes through these locations. This temperature/pressure information can be transmitted to a controller such as the controller 200 of FIG. 2 discussed in detail below for processing.

Although the embodiment of the thermal circuit described above is directed to thermal management of a battery pack 102, it should be understood that the same embodiment can also provide thermal management of other powertrain components (e.g., transmission, inverter, motor) that requires cooling and/or heating. For example, the battery pack 102 in FIG. 1 can be replaced by a motor and thermal circuit 100 can heat and/or cool the motor using the same settings discussed in the four operation modes above. Alternatively, one or more powertrain components such as motor and inverter can be added to thermal circuit 100 of FIG. 1 in parallel to the battery pack 102 along with its own pair of SOV and EXV similar to SOV 136 and EXV 123, which controls the flow of refrigerant to and from the battery pack 102.

Figure 2:
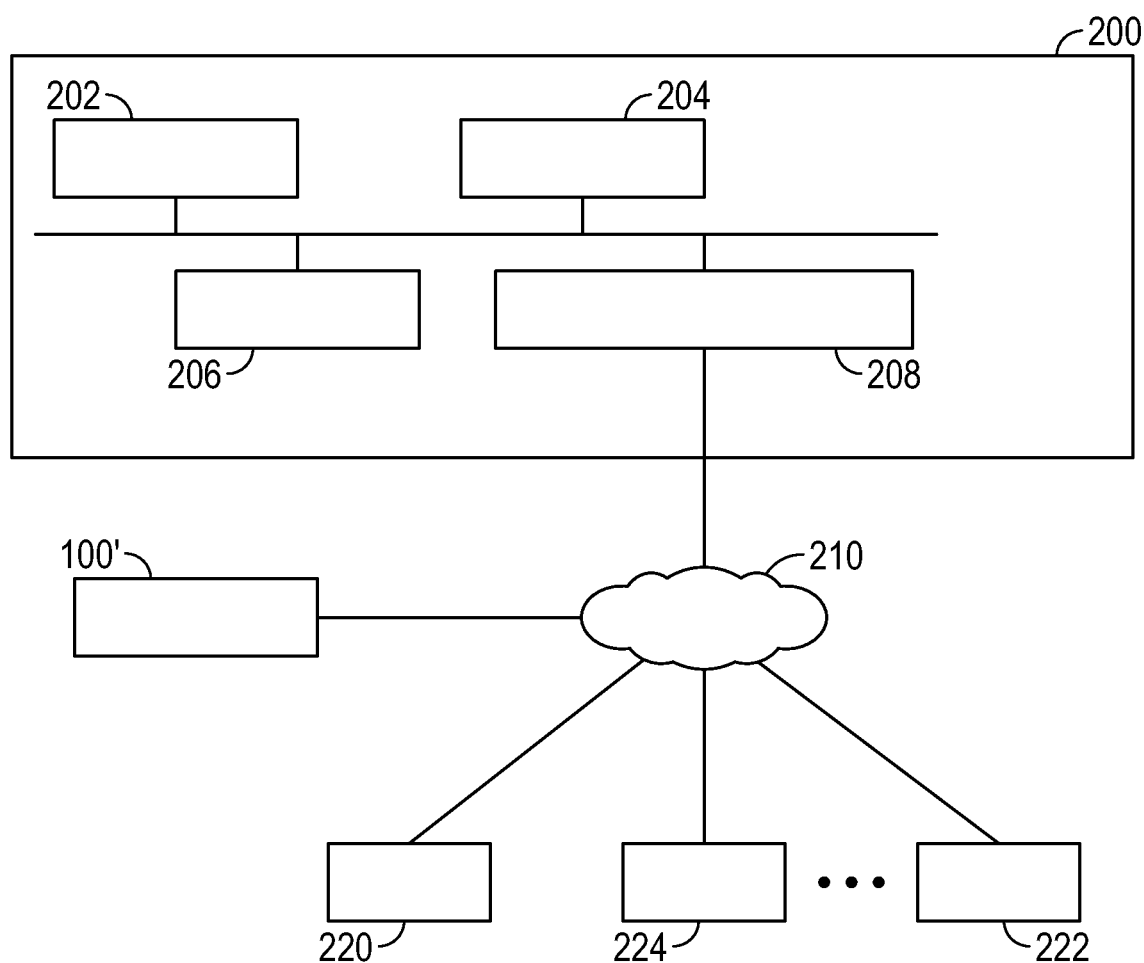
FIG. 2 is a block diagram illustrating the exemplary components of a vehicle thermal control system, according to an embodiment of the present disclosure.

FIG. 2 is a block diagram illustrating the exemplary components of a vehicle thermal control system, according to an embodiment of the present disclosure. The vehicle thermal control system includes a thermal controller 200. Thermal controller 200 may include one or more of the following components: a memory 202, a processor 204, a storage 206, and a communication interface 208. At least some of these components of thermal controller 200 may be configured to transfer data and send or receive instructions between or among each other. Exemplary structures and functions of the components are outlined below.

Processor 204 may include any appropriate type of general-purpose or special-purpose microprocessor, digital signal processor, or microcontroller. Processor 204 may be configured as a separate processor module dedicated to control and actuate the components of thermal circuit of the vehicle. Alternatively, processor 204 may be configured as a shared processor module for performing other functions unrelated to operating the thermal circuit.

Processor 204 may be configured to receive data and/or signals from various components (e.g., sensors) of the vehicle and process the data and/or signals to determine one or more conditions of the vehicle. For example, processor 204 may receive the signal generated by a battery temperature senor 220 via, for example, communication interface 208 through an in-vehicle network 210. Processor 204 may also receive information from another sensor 222 regarding the cabin temperature of the vehicle. This information can also be transmitted over network 210 and through the communication interface 208 of the thermal controller 200.

Additionally and alternatively, thermal controller 200 can also receive information from one or more user interface (UI) 224. An example of a user interface can be a temperature control in the vehicle that allows an occupant of the vehicle to adjust the temperature or set a specific temperature in the passenger cabin. Although FIG. 2 only illustrates two sensors 220, 222 and one UI 224, it should be understood that any number of sensors and UIs can be incorporated into the thermal control system of FIG. 2.

The thermal controller 200 can also be in communication with thermal circuit 100' over the network 210. Thermal circuit 100' can have the same components and configuration as thermal circuit 100 of FIG.1. The controller 200 can transmit control signals to thermal circuit 100 to adjust the operation mode of the thermal circuit 100.

Processor 204 may execute computer instructions (program codes) stored in memory 202 and/or storage 206, and may perform functions in accordance with exemplary techniques described in this disclosure. Memory 202 and storage 206 may include any appropriate type of mass storage provided to store any type of information that processor 204 may need to operate. Memory 202 and storage 206 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 202 and/or storage 206 may be configured to store one or more computer programs that may be executed by processor 204 to perform exemplary thermal management functions disclosed in this disclosure. For example, memory 202 and/or storage 206 may be configured to store program(s) that may be executed by processor 204 to determine the mode of operation of the thermal circuit 100' and, specifically, the settings of the valves in thermal circuit 100'. The program(s) may also be executed by processor 204 to set the valves to the settings according to one of the operation mode of thermal circuit 100' based on the information received by the controller 200 from the one or more sensors 220, 222 and UIs 224.

In some embodiments, processor 200 may control thermal circuit 100' to enter into one of the disclosed operation modes. For example, when the temperature sensor 220 of the battery detects an overheated battery, it can send a signal through the network 210 to the controller 100. The processor 202 in the controller 100 can then determine that the battery pack needs to be cooled and, in turn, send a command through the network 210 to the thermal circuit 100' to set the thermal circuit 100' to one of the second, third, or fourth operation mode discussed above.

As another example, the vehicle needs to be started up in cold weather. One of the features can be that the vehicle receives a start-up signal either locally or from a remote source (e.g., a key fob). To ensure that the battery is in the desirable operation temperature range and that the passenger cabin is warm enough for the occupancy. The thermal controller 200 can set the thermal circuit to the first operating mode in response to the start-up signal. The first operation mode, as discussed above, provides heating to both the battery pack and the passenger cabin.

Referring back to FIG. 2, memory 202 and/or storage 206 may be further configured to store information and data used by processor 204. Memory 202 and/or storage 206 may be configured to store one or more functions specifying the desired amount of heating or cooling and various data concerning the thermal status of the vehicle. In some embodiments, memory 202 and/or storage 206 may also store the sensor data generated by temperature/pressure sensors in the thermal circuit, which may be further processed by processor 204 for other uses.

Communication interface 208 may be configured to facilitate the communication between the thermal controller 200 and other components of the integrated drive/braking system. For example, communication interface 208 may receive a signal generated by the sensors 220, 222 and transmits the signal to processor 204 for further processing. Communication interface 208 may also output commands to thermal circuit 100' or other components of the thermal system for adjusting the settings of the valves and other components.

The in-vehicle network 210 may be a wired network, a local wireless network (e.g., Bluetooth™, WiFi, near field communications (NFC), etc.). In some embodiment, the in-vehicle network 210 can also be connected to an external network such as a cellular network, the Internet, etc. to communicate information with devices outside of the vehicle. Other known communication methods, which provide a medium for transmitting data are also contemplated.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A thermal system of a vehicle, comprising:
a heat exchanger;
an accumulator and a compressor;
a cabin evaporator;
a cabin condenser; and
a battery;
wherein the heat exchanger, accumulator, compressor, cabin evaporator, cabin condenser, and battery are connected to allow refrigerant heat and cool a passenger cabin and the battery in a single closed and connected circuit directly;
wherein the heat exchanger is the only heat exchanger in the closed and connected circuit and the heat exchanger is configured to provide heating through the single closed and connected circuit to both the passenger cabin and the battery when the circuit is in a first mode; and
wherein the heating and cooling of the cabin and the battery are controlled by settings of a plurality of valves.

2. The thermal system of claim 1, wherein the plurality of valves consists of six solenoid valves (SOVs), three electronic expansion valves (EXVs), and one adjustable gas/vapor control valve.

3. The thermal system of claim 2, wherein a first SOV of the six SOVs and a first EXV of the three EXVs are connected in parallel between the heat exchanger and the cabin condenser.

4. The thermal system of claim 3, wherein a second SOV of the six SOVs and a second EXV of the three EXVs are connected in parallel between the battery and the parallel connection of the first SOV and the first EXV.

5. The thermal system of claim 4, wherein a third EXV of the three EXVs is connected between the cabin evaporator and the parallel connection of the first SOV and the first EXV.

6. The thermal system of claim 5, wherein a third SOV of the six SOVs is connected between the compressor and the heat exchanger; and wherein a fourth SOV of the six SOVs is connected between the compressor and the accumulator and the accumulator is connected between the fourth SOV and the heat exchanger.

7. The thermal system of claim 6, wherein the battery is connected between the adjustable gas/vapor control valve and the parallel connection of the second SOV and the second EXV.

8. The thermal system of claim 7, wherein a fifth SOV of the six SOVs is connected between the accumulator and the cabin evaporator.

9. The thermal system of claim 8, wherein a six SOV of the six SOVs is connected between the cabin condenser and the compressor.

10. The thermal system of claim 9, wherein the thermal system is in a first operation mode when the second, fourth, and sixth SOVs are set to an open position, the first, third, and fifth SOVs are set to a closed position, the first EXV is set to an open position; the second and third EXVs are set to a closed position, and the adjustable gas/vapor control valve is set to an open position.

11. The thermal system of claim 9, wherein the thermal system is in a second operation mode when the first, third, and fifth SOVs are set to an open position, the second, fourth, sixth SOVs are set to a closed position, the first EXV is set to a closed position, the second and third EXVs are set to an open position, and the adjustable gas/vapor control valve is set to a closed position.

12. The thermal system of claim 9, wherein the thermal system is in a third operation mode when the fifth and sixth SOVs are set to an open position, the first, second, third, and four SOVs are set to a closed position, the first and third EXVs are set to a closed position, the second EXV is set to an open position, and the adjustable gas/vapor control valve is set to a closed position.

13. The thermal system of claim 9, wherein the thermal system is in a fourth operation mode when the first, third, fifth, sixth SOVS are set to an open position, the second and fourth SOVs are set to a closed position, the first and third EXVs are set to a closed position, the second EXV is set to an open position, and the adjustable gas/vapor control valve is set to a closed position.

* * * * *